US007672824B2

(12) United States Patent
Dutta et al.

(10) Patent No.: US 7,672,824 B2
(45) Date of Patent: Mar. 2, 2010

(54) METHOD FOR SHALLOW WATER FLOW DETECTION

(75) Inventors: Nader Dutta, Houston, TX (US); Subhashis Mallick, Missouri City, TX (US)

(73) Assignee: WesternGeco L.L.C., Houston, TX (US)

( * ) Notice: Subject to any disclaimer, the term of this patent is extended or adjusted under 35 U.S.C. 154(b) by 960 days.

(21) Appl. No.: 10/016,437

(22) Filed: Dec. 10, 2001

(65) Prior Publication Data

US 2003/0110018 A1 Jun. 12, 2003

(51) Int. Cl.
*G06G 7/48* (2006.01)
*G06G 7/50* (2006.01)
(52) U.S. Cl. ............................................. 703/10; 703/9
(58) Field of Classification Search ................. 703/6, 703/10, 9
See application file for complete search history.

(56) References Cited

U.S. PATENT DOCUMENTS 6,665,615 B2 * 12/2003 Van Riel et al. ................. 702/2
6,694,261 B1 * 2/2004 Huffman ........................ 702/1

OTHER PUBLICATIONS

Mallick; Model-based inversion of amplitude-variations with off set data using a genetic algotihm; Geophysics; pp. 939-954; 1995.*
Mallick; Prestack waveform inversion using a genetic algorithm—the present and future; GSEG Recorder; pp. 79-84; Jun. 2001.*
Tygel et al.; Kirchhoff imaging as a tool for AVO/AVA analysis; The Leasding Edge; pp. 940-945; Aug. 1999.*
Mallick: Some practical aspects of prestack waveform inversion using a genetic algorithm: an example from the east Texas Woodbine gas sand; Geophyscis; pp. 326-336; Mar. 1999.*
Mallick et al.; Shallow water flow prediction using prestack waveform inversion of conventional 3D seismic data and rock modeling; 2002; obtained from http://www.westerngeco.com/media/resources/articles/shallow_water_le.pdf.*
Huffman et al.; The petrophysical basis for shallow-water flow prediction using multicomponent seismic data; The Leading Edge Sep. 2001; pp. 1030-1036.*
definition for "P wave"; Britannica Online—http://www.britannica.com/eb/topic-476245/primary-wave; date unknown; pp. 1-2.*
De Kok et al: "Deepwater geohazard analysis using prestack inversion" SEG 2001 Expanded Abstracts, Sep. 9-14, 2001, XP002238616.

(Continued)

*Primary Examiner*—Hugh Jones

(57) ABSTRACT

The present invention presents a method for determining shallow water flow risk using seismic data. The seismic data can be processed to enhance its stratigraphic resolution by sub-sampling the seismic data to less than a two-millisecond interval. Performing a stratigraphic analysis on the seismic data and evaluating the seismic attributes of the seismic data can be used to select a control location. A pre-stack waveform inversion is applied to seismic data at a selected control location to provide an elastic model, which includes pressure-wave velocity and shear-wave velocity. The shallow water flow risk is then determined using the elastic model by comparing the pressure-wave velocity to the shear-wave velocity. A post-stack inversion can be applied on the seismic data using the elastic model to model a 3D volume to determine the shallow water flow risk across the 3D volume.

29 Claims, 6 Drawing Sheets

OTHER PUBLICATIONS

Mallick S: "Some practical aspects of prestack waveform inversion using a genetic algorithm: an example from the east Texas Woodbine gas sand" Geophysics, Mar.-Apr. 1999, Soc. Exploration Geophysicists, USA vol. 64, No. 2, pp. 326-336, XP002238617.

Mallick Subhashis: "Model-based inversion of amplitude variations with offset data using a genetic algorithm" Geophysics Jul. 1993, vol. 60, No. 4, Jul. 1995, pp. 939-934, XP002238786.

Mallick Subhashis et al: "Hybrid seismic inversion: a reconnaissance tool for deepwater exploration" Leading Edge: Leading Edge (Tulsa, OK) Nov. 2000 Soc of Exploration of Geophysicists, Tulsa OK, USA vol. 19, No. 11, Nov. 2000, pp. 1232-1237, XP002238790.

Tygel et al., Kirchoff imaging as a tool for AVO/AVA analysis; The Leading Edge; pp. 940-945; Aug. 1999.

PCT International Preliminary Examination Report dated May 21, 2003.

PCT Written Opinion dated Jun. 24, 2003.

\* cited by examiner

METHOD FOR SHALLOW WATER FLOW DETECTION

FIELD OF INVENTION

This invention relates to the prediction of shallow water flow sands using processed seismic data.

BACKGROUND

Drilling for fossil fuels in deepwater targets can be expensive and risky if not well planned and prepared. Proper well planning requires reliable anticipation of geohazards. One such geohazard in deepwater drilling is shallow water flow ("SWF") sands, which are highly porous sands that are prone to flowing when drilled. If a deep-sea drill permeates these SWF layers, the sands can flow and cause extensive damage to the borehole and the well site. SWF layers have cost the oil industry hundreds of millions of dollars to date. Detection of the SWF layers, therefore, is important for reducing both commercial loses and environmental risks.

FIG. 1 is a representation of the current understanding of the formation of a SWF. SWF sands can occur in water depths between 300 m and 600 m below the mud line 101. They are found all over the world in areas where loose and unconsolidated sediments with high sedimentation rates create overburden layers 102. A low permeability seal 103 and a layer of shale or mudstone 105 underlie the SWF sands 104. This underlying zone 103 and 105 is the condensed section where sediments are compacted and the rate of sedimentation is low. If there are isolated sand bodies 104 within this shale or mudstone 105, then the water from such bodies will not escape easily due to the presence of low permeability sediments 105 around them. Additionally, the high rate of sedimentation from the overburden 102 can exert an enormous pressure on these sediments, causing these isolated bodies with large amounts of water to be over-pressured 106.

When a drill bit punctures the SWF layer, the resulting over-pressured sand 104 can flow at the wellhead and pose drilling, environmental, and health problems. For example, SWF can cause drilling template-blowouts, buckling of casing, loss of well or wellhead, costly downtime in rig, and can result in leakage of hydrocarbon in the seabed, which can cause severe environmental damage.

Reliable detection of potentially hazardous SWF situations is key to controlling the problem and for managing the associated costs.

It has been common practice to use pore pressure to locate potential SWF sands. Pore pressure can be predicted before drilling from conventional seismic stacking velocities with a normal compaction trend analysis using, for example, the well-known Eaton approach. Velocities that appear to be slower than "normal velocities" are indicative of overpressure, which then is quantified using an empirical equation.

There are several problems with the conventional approach. First, conventional seismic stacking velocities are usually unsuited for pressure prediction because they are not rock or propagation velocities. Second, these velocities lack resolution in depth. Third, in a deepwater environment, sediment loading often has been so fast that fluid pressures in these sediments are above hydrostatic below the mud line. This prevents development of a normal compaction trend; thus invalidating the entire approach in deepwater.

SUMMARY OF THE INVENTION

The present invention presents a method for determining shallow water flow risk using seismic data. A pre-stack waveform inversion is applied to seismic data at a selected control location to provide an elastic model, which includes pressure-wave velocity and shear-wave velocity. The shallow water flow risk is then determined using the elastic model by comparing the pressure-wave velocity to the shear-wave velocity.

The seismic data can include one-dimensional seismic data, two-dimensional seismic data, or three-dimensional seismic data. The elastic model can also include attributes, such as density, Poisson's ratio, and Lamé elastic parameters.

The seismic data can be processed to enhance its stratigraphic resolution. The processing can include sub-sampling the seismic data to less than two millisecond intervals, using an algorithm with an amplitude preserving flow, or using an algorithm, such as pre-stack time migration, accurate velocity normal-moveout correction, or noise removal algorithms.

A control location can be selected within the seismic data by the user or automatically. Additionally, there can be more than one control location used. The control location can be selected by performing a stratigraphic analysis on the seismic data to determine the control location. The stratigraphic analysis can include developing a geologic model. Once the geologic model is known, the control location can be identified by identifying a geologic feature, such as faults, blowouts, bioherms, chaotic facies, cones, diapers, domes, gas vents, gas mounds, mud volcanoes, popckmarks, scarps, slumps, channels, slope fan deposition, and bottom simulator reflectors.

The control location can also be selected by evaluating the seismic attributes of the seismic data. The evaluation can include using amplitude-variation-with-offset attributes, which can include intercept and gradient. The evaluation can also include evaluating changes in polarity.

The pre-stack waveform inversion can include a full pre-stack waveform inversion. The pre-stack waveform inversion can include applying a genetic algorithm. The genetic algorithm can include generating elastic earth models. Pre-stack synthetic seismograms can be generated for these elastic earth models. The generated seismograms can be matched with the seismic data. A fitness for the elastic earth models can be generated. The elastic earth models can be genetically reproduced using the fitness for the elastic earth models. A convergence can be determined for the reproduced elastic earth models to select the elastic model.

The elastic earth models can include a random population of the elastic earth models. An exact wave equation including a mode conversion and interbed multiple reflections can be used to generate the seismograms for the elastic earth models. The matching of the generated seismograms with the seismic data can include matching the normal moveout of the generated seismograms and the seismic data, and matching reflection amplitudes of the generated seismograms and the seismic data.

The following method can be used to genetically reproduce the elastic earth models using the fitness for the elastic earth models. The elastic earth models can be reproduced in proportion to the elastic earth models fitness. The reproduced elastic earth models can be randomly crossed. The reproduced elastic earth models can be mutated.

A post-stack inversion on the seismic data using the elastic model can be performed to determine the shallow water flow risk over a 3D volume. The post-stack inversion can be performed using an AVO intercept and a pseudo shear-wave data volume.

The shallow water flow risk can be identified when the pressure-wave velocity compared to the shear-wave velocity is between approximately 3.5 and approximately 7.

The disclosed method may have one or more of the following advantages. The method can be trendline independent using a deepwater rock model for geopressure analysis. It can be based on several seismic attributes, such as velocities and amplitudes and can be calibrated with offset well information. Pore pressure can be calculated as the difference between overburden stress and effective stress. The effective stress can affect the grain-to-grain contacts of elastic, sedimentary rock, and consequently, the velocities of seismic waves propogating through such rocks.

The rock model can have various components: relations between porosity, lithology and velocity, clay dehydration, and transformations relating both density and Poisson's ratios of the sediments to effective stresses acting on the matrix framework.

The key inputs that can drive the rock model are pressure wave and shear wave velocities obtained from a variety of velocity tools. Iterative velocity calibration and interpretation can be two steps in the prediction process to ensure that the velocity fields are within the realm of expected rock or propagation velocities.

The proposed invention does not require reacquisition of seismic data. Conventional two-dimensional and three-dimensional data can be reprocessed for SWF conditions.

DETAILED DESCRIPTION OF THE PREFERRED EMBODIMENTS

Surface seismic data are useful in predicting SWF zones because they are available before drilling begins in the deepwater wells.

Processing of High-Resolution 3D Seismic Data

Figure 1:
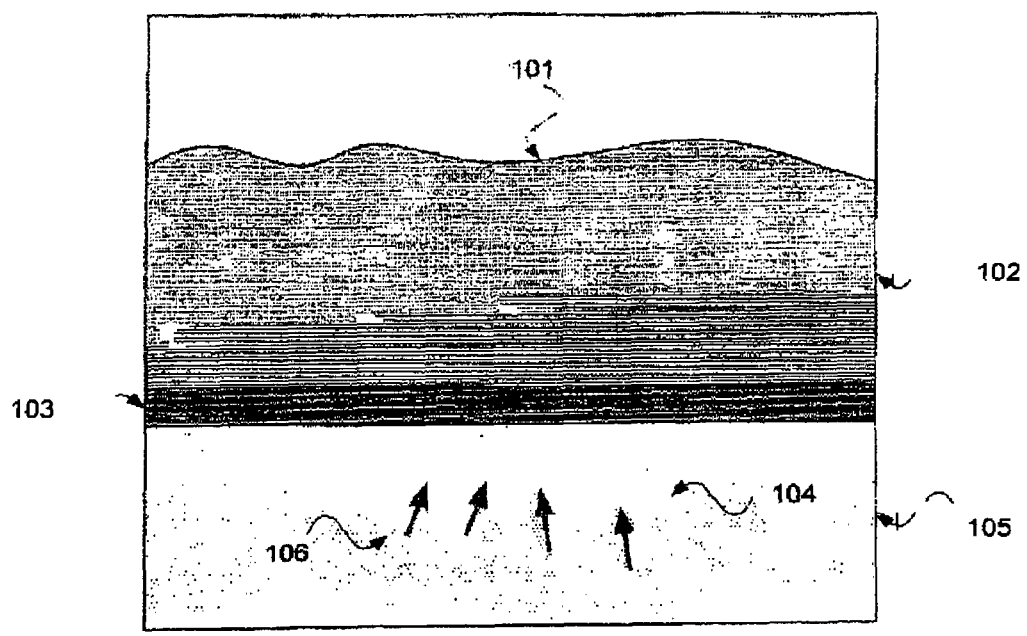
FIG. 1 is an illustration of Shallow Water Flows.
Figure 2:
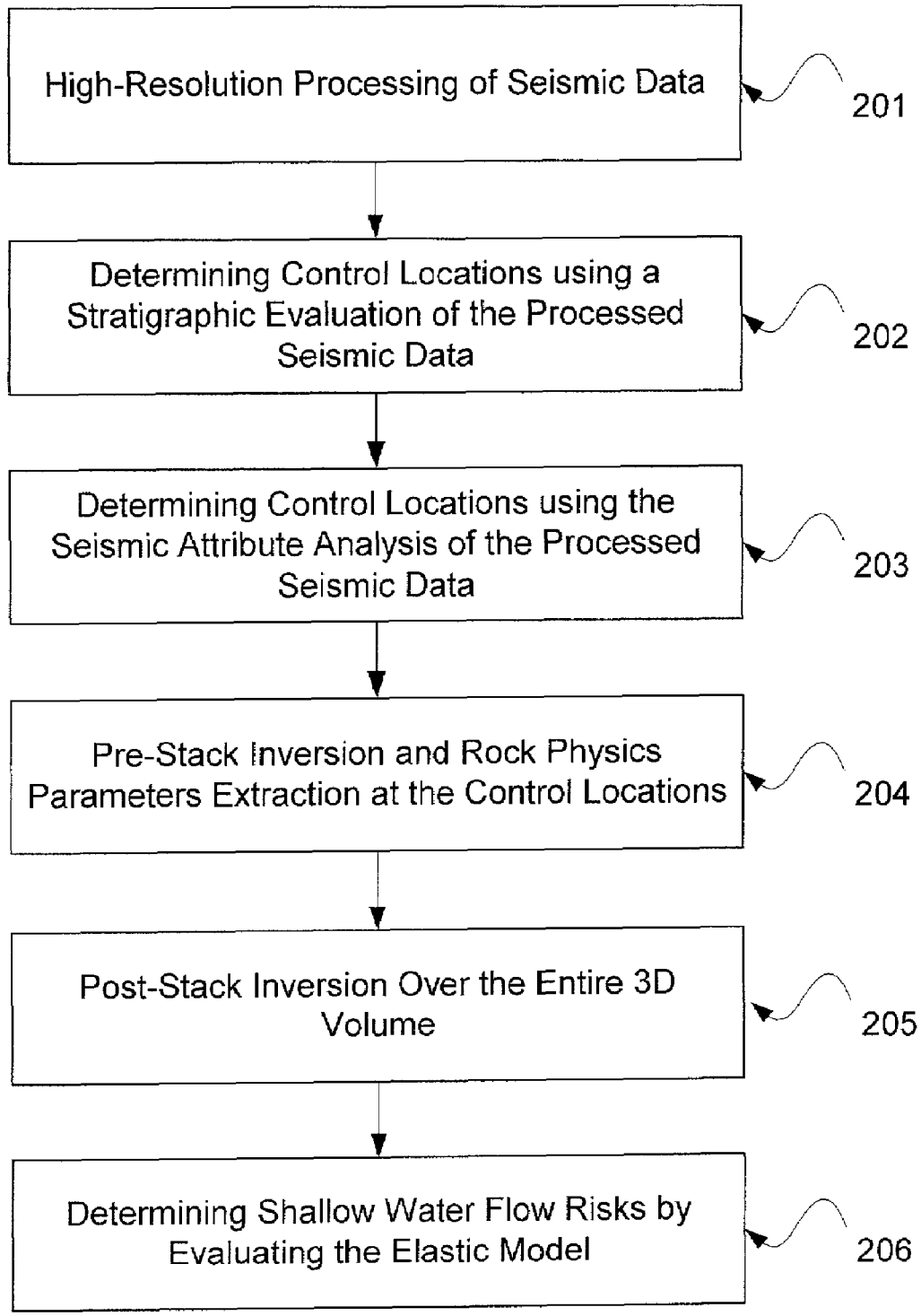
FIG. 2 is a flowchart for the detection of Shallow Water Flows.

FIG. 2 shows a flowchart for the detection of SWF. First, seismic data can be processed to enhance its stratigraphic resolution 201. The stratigraphic resolution is the ability to differentiate and resolve stratigraphic features in a seismic image. The enhanced resolution improves the frequency content of the seismic data and can be used more effectively to detect thin sand bodies.

The seismic data that is used can either be acquired solely for detection of SWF, or can be seismic data that has been acquired for different modeling purposes, and reprocessed for detection of SWF. The seismic data can be three-dimensional ("3D"), two-dimensional ("2D"), or one-dimensional ("1D") data. For example, borehole 1D data can be used to detect SWF, and full 3D seismic data can be used to detect SWF in a well field. The seismic data can be acquired using any known acquisition technique, such as towing streamers behind a seismic vessel and measuring the reflection of acoustic waves generated by marine sources.

The processing of the seismic data can involve sub-sampling the recorded seismic data to two or fewer millisecond intervals. The input of the seismic data can include long offsets, such as incident angles exceeding 35 degrees for events at the objective depth levels. The seismic data can also be processed using an amplitude preserving flow followed by pre-stack time migration, accurate velocity normal-moveout correction, and noise removal algorithms. These algorithms are well known in the art. FIG. 3a shows the processed 3D seismic data displayed for evaluation.

Stratigraphic Analysis of Processed Seismic Data

Once the data has been processed, a stratigraphic analysis of the processed seismic data can be performed 202. The interpretation of sedimentary depositional systems enables qualitative assessment of potential drilling hazards including SWF sands. The stratigraphic evaluation of the processed seismic data 202 is an interpretative step that allows the geologic sequences modeled by the processed seismic data to be classified based on risk of SWF. During this process, a geologic model can be developed to evaluate the processed seismic data.

Figure 3:
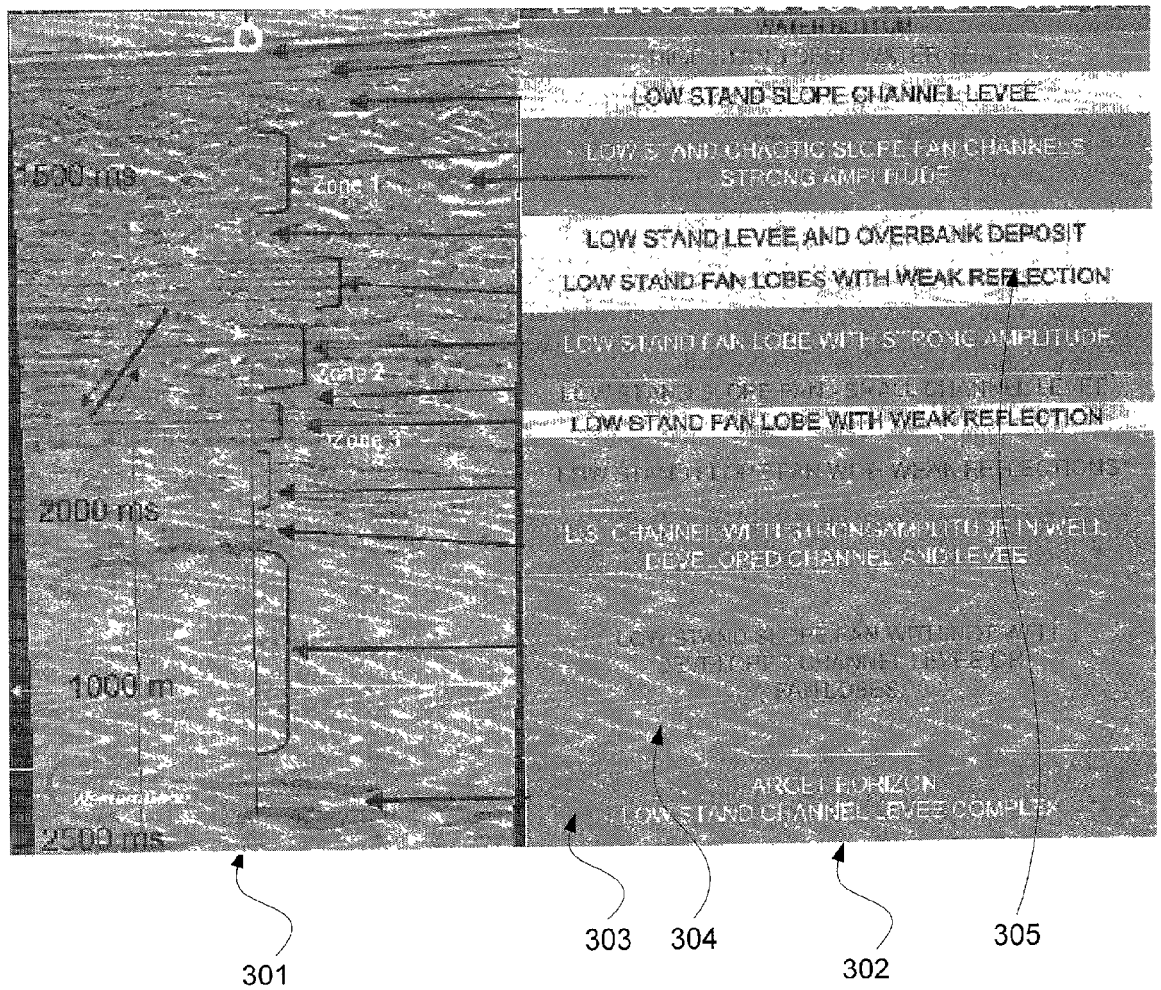
FIG. 3 is an illustration of the results of the Stratigraphic Evaluation and Seismic Attribute Analysis.

FIG. 3 shows the evaluation for processed seismic data 301. During the stratigraphic analysis, different areas of the well site are evaluated for SWF risk using the processed seismic data 301 and assigned a rating level from "high" to "low" 302. This rating will be used to focus the SWF evaluation to problematic areas. For example, the low stand channel levee complex 303 is rated "red" for high, the low stand slope fan 304 is rated "green" for low, and the low stand fan lobes with weak reflection 305 is rated "yellow" for medium.

The stratigraphic interpretation 202 can be done manually, for example by trained geophysicists or geologists, or automatically, for example by a computer system. The stratigraphic interpretation 202 can result in a geologic model that is used for evaluation. Many techniques, whether employed by experts or computer systems, can be used for the stratigraphic analysis. Below are examples of some of these techniques.

Drilling hazards on the slope of the sea floor can be identified using seismic horizons. The seismic horizons can be interpreted from continuous sequence boundary reflectors, which can define a time structure map. Faults can be picked where discontinuities and offsets occur in the data. If the water bottom is deep enough for continuous 3D seismic coverage, then geologic features, such as faults, blow-outs, bioherms, chaotic facies, cones, diapirs, domes, gas vents, gas mounds, mud volcanoes, pockmarks, scarps, slumps, and channels, can be mapped at the sea floor. These features can be drilling hazards on the slope of the sea floor. Signal enhancement can be performed on the seismic data or generated on the computed interpretation workstations to visualize these features.

SWF potential can also depend on the presence of isolated permeable sands in certain depositional environments. One such depositional environment in a slope fan deposition indicated by basin floor fans or channel levees. These slope fan depositions can be pressured by overburden compaction and might be indicative of SWF sands. Seismic interpretation based on horizon slices and amplitudes extracted from the 3D seismic data over intervals, for example, starting from the sea floor to about 3000 feet below the sea floor, can be mapped to give a view of this depositional environment.

Bottom simulator reflectors ("BSFs"), which may cut across normal stratigraphy, may present another SWF hazard potential. BSFs can originate from the high acoustic impedance at the phase boundary between gas hydrates and free gas at the base of the hydrate stability zone.

Using this stratigraphic analysis, portions of the seismic section can be qualitatively ranked according to relative SWF or drilling hazard risk. Strong amplitude, 3D sand bodies associated with fan lobe deposits, sand filled channel complexes, levee over bank deposits, debris flow, slump deposits, and BSRs are qualitatively ranked high for SWF risk. Isolated low amplitude reflectors are characteristic of slope fan deposits and are marked for moderate SWF risk. Parallel bedded, draping, weak to strong reflectors are probably deepwater marine shale that is not permeable, and are marked low for little SWF risk.

Seismic Attribute Analysis

The geologic model developed in the stratigraphic analysis step 202 can be validated and clarified for use in SWF prediction using a seismic attribute analysis 203. Pre-stack seismic amplitude-variation-with-offset ("AVO") attributes can be used to evaluate semi-quantitatively the potential for SWF flows. AVO attributes used can include intercept (P), gradient, (G), and linear combinations of intercept and gradients.

AVO attributes of a reflection event can be defined by a mathematical fit (using, for example, a linear or higher order regression) of trace amplitudes at various offsets or incident energy angle range. The amplitude attribute for the normal incidence (or zero offset) is P, and the amplitude change with offset (or slope) is G.

The AVO attributes can be derived from the processed seismic data 201 discussed above. AVO signatures involving phase reversal with offset and high gradients of sign opposite to intercept amplitudes may be indicative of SWF deposits.

Figure 4:
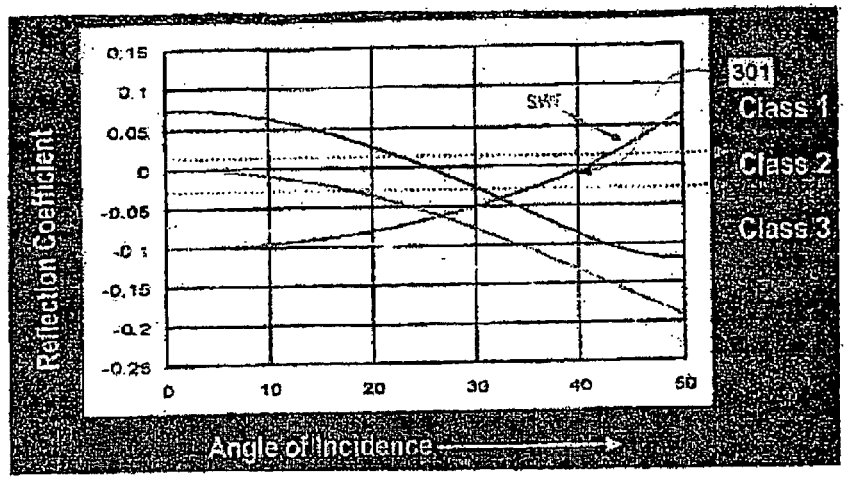
FIG. 4 is a graph showing the use of the Seismic Attribute Analysis.

AVO signatures for SWF reflections are characterized by an effect that is opposite to the AVO signatures classified by sand reflections. As shown in FIG. 4, SWF reflections change polarity 401. The angle at which this phase reversal takes place 401 is governed by the elastic strengths of the SWF body and the surrounding seal. This class of signatures may be identified in the seismic data manually or automatically to identify possible candidates for SWF deposits.

In FIG. 4, the Class 1 section identifies areas with positive reflection coefficients, the Class 2 section identifies areas with close to 0 reflection coefficient, and the Class 3 section identifies areas with negative reflection coefficients. Areas where the angle of incidence changes between approximately 30 and 40 degrees and there is a polarity change in the reflection coefficient 301 can be marked as risky areas for SWF.

These qualitative indicators, along with the stratigraphic criteria 202, are used to select optimal, representative control locations to execute the pre-stack inversion and rock physics parameters extraction for more quantitative rock property parameter extrapolation in subsequent steps. AVO attribute extractions within the stratigraphic framework of horizons 202 can enable spatial qualitative detection and delineation of potential SWF deposits.

Pre-Stack Inversion

Once the geologic model has been formed, a pre-stack inversion and rock physics parameters extraction is used at the selected control locations to determine the risks of the previously determined problematic SWF zones 204. Pre-stack waveform inversion and hybrid inversion provide a way to compute an elastic model, which contains seismic attributes such as compressional waves ("P-wave") and shear-wave ("S-wave") impedance, Poisson's ratio, Lamé elastic parameters, and bulk density over the data volume. A full or partial pre-stack waveform inversion can be implemented.

During the pre-stack waveform inversion, the elastic rock parameters are extrapolated throughout the seismic volume by obtaining critical Vp and Vs information from the pre-stack inversion well control to extrapolate Vp and Vs by inverting the AVO attribute volumes laterally constrained by the seismic horizons obtained from the stratigraphic interpretation. Since SWF deposits can be characterized by anomalous Vp/Vs ratios, the observable product is a Vp/Vs area.

Full elastic waveform seismic inversion can be performed using the processed pre-stack seismic gathers at control locations based on locations selected from the stratigraphic evaluation 202 and seismic attribute analysis 203. These control locations focus the analysis on areas within the processed seismic data that are considered higher risk. In effect pseudo well logs consisting of rock physics parameters are generated at these locations. The number of control point locations can vary depending on the geological complexity of the area being studied.

Figure 5:
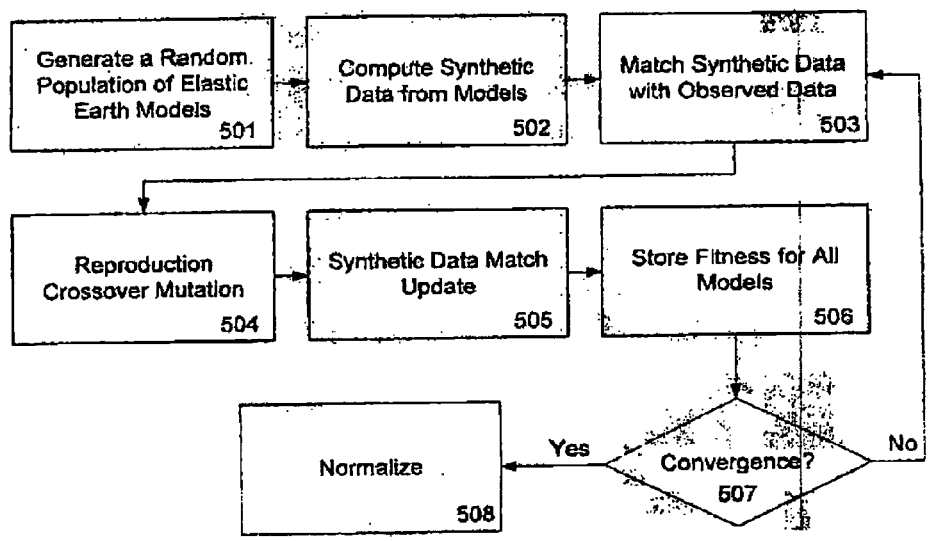
FIG. 5 is a flowchart of the pre-stack Genetic Algorithm inversion.

The pre-stack waveform inversion gives an estimate of the elastic models at the selected control locations. The elastic models include the P-wave velocity, S-wave velocity, and density. The pre-stack waveform inversion can be performed with an optimization method using a genetic algorithm ("GA"). A GA is a Monte-Carlo type optimization procedure. FIG. 5 shows a flowchart describing such a GA algorithm.

The first step in GA inversion is the generation of a random population of elastic earth models 501. These random models are generated around a mean elastic model of the area that comes from some prior knowledge, such as from well information or geology.

Once these random models are generated, pre-stack synthetic seismograms are computed for each of these generated models 502. Pre-stack synthetics can be generated using an exact wave equation based approach that includes mode conversions and interbed multiple reflections. This allows modeling of all the detailed features present on real seismic data, such as interference or tuning effects, and transmission effects.

Once the synthetic seismograms are computed, they are then matched with the observed data 503. In matching the synthetic data with observational data, normal moveout ("NMO") and reflection amplitudes are matched simultaneously. This feature allows the waveform inversion to simultaneously extract both the low and the high frequency components of the model, allowing this method to be applicable in the absence of any well information.

The match of synthetic data with observation assigns each random model a goodness of fit, or simply a fitness. Once the fitness of each model is computed, models are then modified using three operations: reproduction, crossover, and mutation 504.

In reproduction, models are simply reproduced in proportion to their respective fitness values. In crossover, members of the reproduced population are chosen randomly as parents. Their model contents are then partially swapped to produce two children. Finally, in mutation, the model contents of the child population are changed. For a parent model population of size 2N, N crossovers and mutations will thus produce a child population of size N.

After mutation, synthetic seismograms for each child model are computed and matched with observational data 503. This gives the fitness value of each child model. In update, the fitness values of each pair of parents and their children are compared, and the two with the highest fitness values are copied into the next generation of models.

At this point, a check for convergence is performed 507. If the convergence is achieved, the new generation of models are again reproduced, crossed over, mutated, and updated. The fitness of each model, generated in the entire course of the run is stored in the model space. When the convergence is achieved, the stored fitness values are normalized. These normalized fitness values give the a-posteriori probability density function ("PPD") of the model. The PPD is a function describing the probability of the model. The most likely model, therefore, is the one with the highest PPD value. The width of the PPD function is an estimate of the errors or uncertainties for the estimation of the most likely model. The most likely model, therefore, is computed from the highest value of the PPD and its width.

Figure 6:
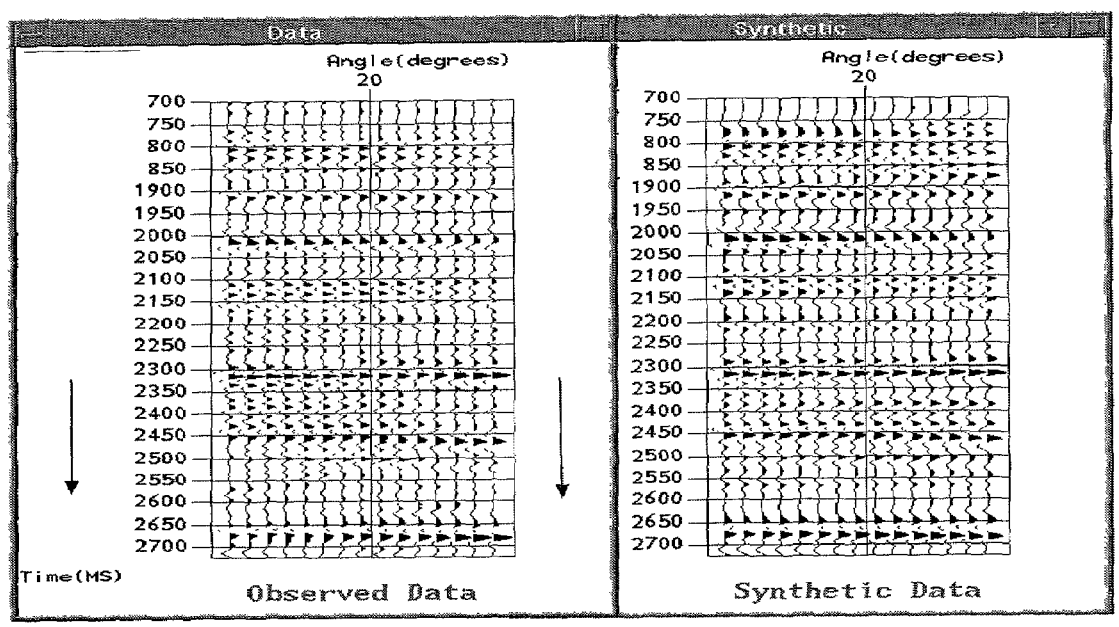
FIG. 6 is a comparison showing real data from a gather from the 3D volume at 2 ms and the synthetic data output of the Genetic Algorithm.
Figure 7:
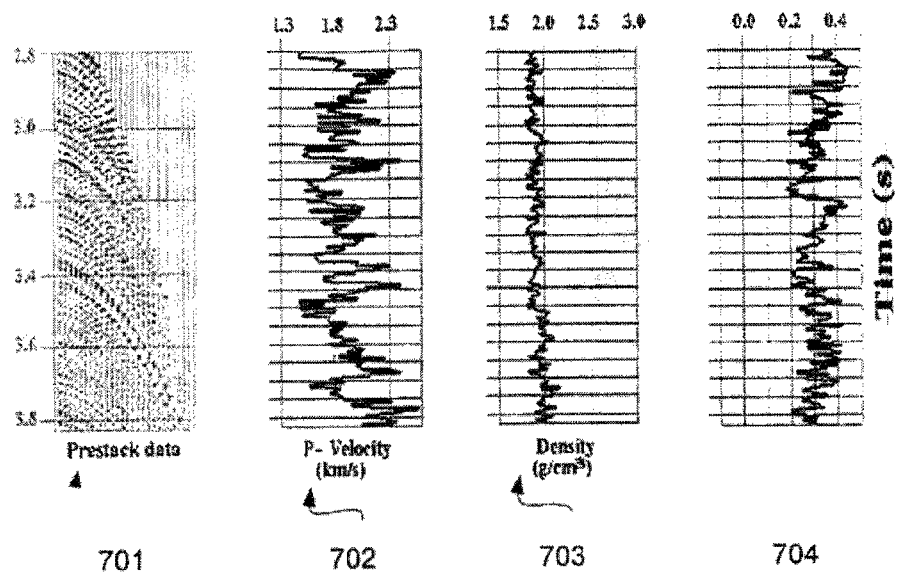
FIG. 7 is a graph of the result of a 3D pre-stack inversion implemented using a Genetic Algorithm.

Once the most likely model is obtained, synthetic seismograms are computed from this model and are compared with the observed data. FIG. 6 shows such a comparison of actual observed data gathered from a 3D volume at 2 ms compared to the output date of the GA procedure. Notice that all major features in the observed data are also preset in the synthetic data in FIG. 5. This comparison proves the validity of the most likely model obtained from inversion.

The pre-stack inversion computes the elastic model including P-wave velocity, density, and Poisson's ratio for each control locations. From these elastic models, first the P-wave and the S-wave impedance are computed. Assuming the P-wave velocity, density, and Poisson's ratio are given as $V_P$, $\rho$, and $\nu$, respectively, the P-wave and S-wave impedance $I_P$ and $I_S$ are given as $$I_P = \rho V_P,$$

Equation 1 and $$I_S = \rho V_S = \rho V_P \sqrt{\frac{1-2\nu}{2(1-\nu)}}.$$

Equation 2

After calculating $I_P$ and $I_S$ as above, in the next step, a standard AVO processing of the entire pre-stack data is performed. In AVO processing, it is assumed that for small (usually less than 25°) incidence angles, the reflection amplitudes R in pre-stack data can be expressed as a function of incidence angle θ as $$R(\theta) \approx P + G \sin^2 \theta$$

Equation 3, where P is the AVO intercept and G is the AVO gradient. The AVO intercept P is normal incidence P-wave reflectivity, given as $$P = \frac{1}{2}\left(\frac{\Delta V_P}{V_P} + \frac{\Delta \rho}{\rho}\right),$$

Equation 4 and the AVO gradient G is given as $$G = \frac{1}{2}\frac{\Delta V_P}{V_P} - \frac{2\Delta \mu}{\rho V_P^2}.$$

Equation 5

In Equations 4 and 5, $V_P$ is the P-wave velocity, $\rho$ is the density, and $\mu$ is the shear modulus, and $\Delta V_P$, $\Delta \rho$, and $\Delta \mu$ are their respective contrasts. The shear modulus $\mu$ can be expressed in terms of S-wave velocity $V_S$ and density $\rho$ as $$\mu = \rho V_S^2$$

Equation 6, so that $\Delta \mu$ can be written as $$\Delta \mu = V_S^2 \Delta \rho + 2\rho V_S \Delta V_S$$

Equation 7,

Combining Equations 5 and 7 we get $$G = \frac{1}{2}\frac{\Delta V_P}{V_P} - 2\frac{V_S^2}{V_P^2}\frac{\Delta \rho}{\rho} - 4\frac{V_S^2}{V_P^2}\frac{\Delta V_S}{V_S}.$$

Equation 8

Finally, if the background $V_P/V_S$ is approximately equal to two, we get from Equations 4 and 8

$$\frac{1}{2}(P-G) = \frac{1}{2}\left(\frac{\Delta V_S}{V_S} + \frac{\Delta \rho}{\rho}\right).$$

Equation 9

Now comparing Equation 9 with Equation 4, and recalling that the AVO intercept P, shown in Equation 4 is the P-wave reflectivity at normal incidence, it follows that ½(P−G), shown in Equation 9, must be the S-wave reflectivity at normal incidence. This S-wave reflectivity is not obtained directly from S-wave data, but is obtained indirectly from the AVO analysis of P-wave data. It is therefore called the pseudo S-wave reflectivity.

A linear fit to the reflection amplitudes of pre-stack seismic data will therefore give the AVO intercept, or the normal incidence P-wave reflectivity (P traces), AVO gradient (G traces), and the normal incidence S-wave reflectivity (pseudo S-wave traces). A post-stack inversion of P traces, using the pre-stack P-wave impedance computed at the control locations as well controls would thus give the P-wave impedance, $I_P$ for the entire 3D volume. Similarly, post-stack inversion of the pseudo S-wave traces with S wave impedance computed at the pre-stack control points as well controls would give the S-wave impedance, $I_S$ for the volume. Once $I_P$ and $I_S$ are obtained, the P- to S-wave velocity ratio $V_P/V_S$ is obtained from $$\frac{V_P}{V_S} = \frac{I_P}{I_S}.$$

Equation 10

The Poisson ratio $\nu$ is then computed as $$\nu = \frac{1 - 2\left(\frac{V_S}{V_P}\right)^2}{2\left[1 - \left(\frac{V_S}{V_P}\right)^2\right]}.$$

Equation 11

FIG. 6 is an example of the implementation of the described equations to pre-stack data 501 to derive P-wave velocity 502, density 503, and Poisson's Ratio 504.

Once the pre-stack waveform inversion at the selected locations is performed, the elastic models at these locations can be used as well information for post-stack inversion over the entire volume 206. This process of running post stack inversion followed by pre-stack inversion is called "hybrid inversion."

Post-Stack Inversion Over the Entire 3D Volume

The result of the described methodology is an estimation of $V_P/V_S$ at control locations. Once the pre-stack waveform inversion at the selected locations is performed, the elastic models at these locations can be used as "well information" for post-stack inversion over an entire 3D volume 205.

Evaluating the Shallow Water Flow Risk

In terms of rock properties, the SWF sediments are closer to a suspension than to a rock. Thus, their compressional velocities and bulk densities are low—in some cases, velocities are close to water velocity. Shear velocities are even lower—approaching zero as the depths of these sediments below mud-line approach zero. Therefore, the SWF sediments are believed to have a P-wave velocity ($V_P$) between 1500-1800 m/s, and a low S-wave velocity ($V_S$), such that the $V_P/V_S$ is between approximately 3.5 and 7. Therefore, by estimating the $V_P/V_S$, the zones having high values of $V_P/V_S$ compared to an average background value can be regarded as potential SWF zones.

Figure 8:
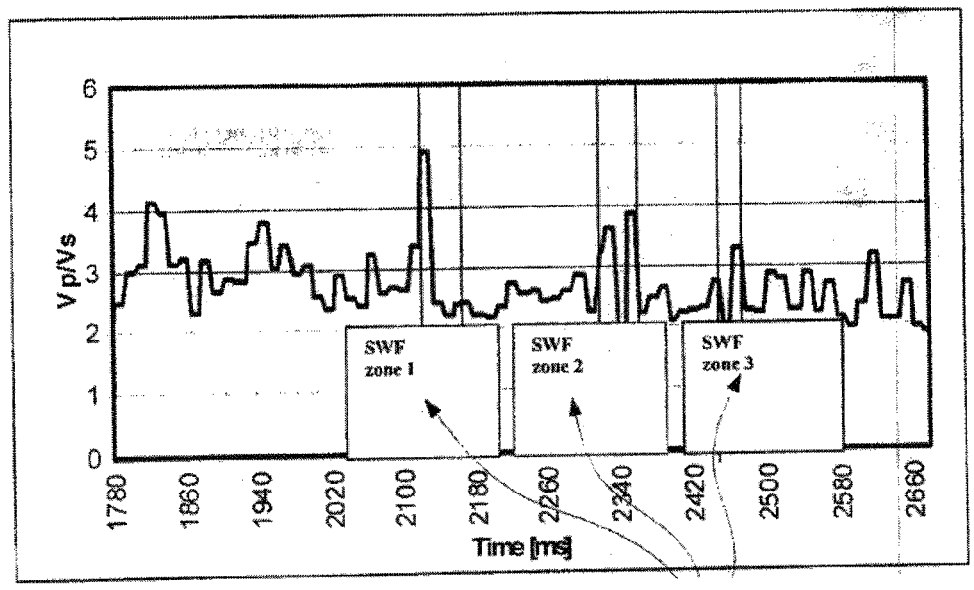
FIG. 8 is a graph of the Vp/Vs output demonstrating the determined SWF risk zones.

This is demonstrated in FIG. 8. The SWF risk areas 301 match the high $V_P/V_S$ compared to the average background values. Since high $V_P/V_S$ is equivalent to a high value of Poisson's ratio, SWF layers can also be associated with high values of Poisson's ratio. Computing Poisson's ratio and/or $V_P/V_S$ from pre-stack GA and hybrid inversion, and identifying zones with high values of $V_P/V_S$ and Poisson's ratio, compared to their relative background values, provide an effective method of detecting SWF layers from pre-stack seismic data. Thus these sediments have high pressure-wave to shear-wave velocity ratio (Poisson's ratios being close to 0.5).

A number of embodiments of the present invention have been described. Nonetheless, it will be understood that various modifications may be made without departing from the spirit and scope of the invention. Accordingly, other embodiments are within the scope of the following claims.

The invention claimed is:

1. A method for determining shallow water flow risk, comprising:
   developing a geologic model of shallow water flow risk areas;
   performing a stratigraphic analysis on reflected P-wave seismic data of the geologic model to determine a control location within the reflected P-wave seismic data;
   applying a pre-stack full waveform inversion on the reflected P-wave seismic data at the control location to provide an elastic earth model of the shallow water flow risk areas based on the geologic model and the stratigraphic analysis, wherein the elastic earth model is determined by matching the reflected P-wave seismic data with synthetic seismic data of the geologic model and the elastic earth model comprises P-wave velocity and S-wave velocity;
   computing a ratio between the P-wave velocity and the S-wave velocity; and
   identifying multiple shallow water flow risk areas using the relationship of the P-wave velocity to the S-wave velocity ratio with respect to seismic travel time.

2. The method of claim 1, wherein the seismic data comprises seismic data selected from the list consisting of one-dimensional seismic data, two-dimensional seismic data, and three-dimensional seismic data.

3. The method of claim 1, wherein the elastic earth model further comprises attributes selected from the list consisting of density, Poisson's ratio, and Lamé elastic parameters.

4. The method of claim 1, further comprising processing the seismic data to enhance its stratigraphic resolution.

5. The method of claim 4, wherein the processing the seismic data comprises sub-sampling the seismic data to less than two millisecond intervals.

6. The method of claim 4, wherein the processing the seismic data comprises using an algorithm with an amplitude preserving flow.

7. The method of claim 4, wherein the processing the seismic data comprises using an algorithm selected from the list consisting of a pre-stack time migration, accurate velocity normal-moveout correction, and noise removal algorithms.

8. The method of claim 1, wherein the control location comprises a plurality of control locations.

9. The method of claim 1, wherein performing the stratigraphic analysis comprises identifying the control location by using the geologic model to identify a geologic feature selected from this list consisting of faults, blow-outs, bioherms, chaotic facies, cones, diapers, domes, gas vents, gas mounds, mud volcanoes, popckmarks, scarps, slumps, channels, slope fan deposition, and bottom simulator reflectors.

10. The method of claim 1, wherein selecting the control location within the seismic data further comprises evaluating the seismic attributes of the seismic data.

11. The method of claim 10, wherein evaluating the seismic attributes comprises using amplitude-variation-with-offset attributes, comprising intercept and gradient.

12. The method of claim 10, wherein evaluating the seismic attributes comprises evaluating polarity changes in reflection coefficient.

13. The method of claim 1, wherein the pre-stack full waveform inversion comprises applying a genetic algorithm.

14. The method of claim 13, wherein the genetic algorithm comprises:
   generating a plurality of elastic earth models;
   generating pre-stack synthetic seismograms for the elastic earth models;
   matching the generated seismograms with the seismic data;
   generating a fitness for the elastic earth models;
   genetically reproducing the elastic earth models using the fitness for the elastic earth models; and
   determining convergence of the reproduced elastic earth models to select the elastic earth model.

15. The method of claim 14, wherein the plurality of elastic earth models comprises a random population of the elastic earth models.

16. The method of claim 14, wherein matching the generated seismograms with the seismic data further comprises matching normal moveout of the generated seismograms and the seismic data, and matching reflection amplitudes of the generated seismograms and the seismic data.

17. The method of claim 14, wherein genetically reproducing the elastic earth models using the fitness for the elastic earth models comprises:
   reproducing the elastic earth models in proportion to the elastic earth models fitness;
   randomly crossing over the reproduced elastic earth models; and
   mutating the reproduced elastic earth models.

18. The method of claim 1, wherein applying the pre-stack full waveform inversion comprises using an exact wave equation having mode conversions and interbed multiple reflections.

19. The method of claim 1, further comprising applying a post-stack inversion on the seismic data using the elastic earth model to determine the shallow water flow risk over a 3D volume.

20. The method of claim 19, wherein the post-stack inversion is performed using an AVO intercept and a pseudo shear-wave data volume.

21. The method of claim 1, wherein shallow water flow risk is identified when the P-wave velocity compared to the S-wave velocity is between approximately 3.5 and approximately 7.

22. The method of claim 1, wherein the P-wave seismic data are a single component P-wave seismic data.

23. The method of claim 1, wherein the S-wave velocity is obtained indirectly from an amplitude variation with offset (AVO) analysis of the P-wave seismic data.

24. The method of claim 1, wherein the stratigraphic analysis excludes S-wave seismic data that would have been acquired in a marine environment.

25. The method of claim 1, wherein applying the pre-stack full waveform invention comprises deriving the S-wave velocity.

26. A computerized method for determining shallow water flow risk using seismic data comprising:
   processing reflected P-wave seismic data to enhance its stratigraphic resolution, wherein the reflected P-wave seismic data are obtained from marine towed streamers;
   selecting a control location comprising:
      performing a stratigraphic analysis on the reflected P-wave seismic data; and
      evaluating the seismic attributes of the reflected P-wave seismic data;
   applying a pre-stack full waveform inversion on the reflected P-wave seismic data at the control location to provide an elastic earth model of shallow water flow risk areas, wherein the elastic earth model is determined by matching the reflected P-wave seismic data with synthetic seismic data of the geologic model and the elastic earth model comprises P-wave velocity and S-wave velocity;
   applying a post-stack inversion on the reflected P-wave seismic data using the elastic earth model to map a ratio between the P-wave velocity and the S-wave velocity in a three dimensional (3D) volume; and
   determining multiple shallow water flow risk areas using the relationship of the ratio between the P-wave velocity and the S-wave velocity with respect to seismic travel time.

27. The method of claim 26, wherein the pre-stack waveform inversion comprises using a genetic algorithm comprising:
   generating a plurality of elastic earth models;
   generating pre-stack synthetic seismograms for the elastic earth models;
   matching the generated seismograms with the seismic data;
   generating a fitness for the elastic earth models;
   genetically reproducing the elastic earth models using the fitness for the elastic earth models; and
   determining convergence of the reproduced elastic earth models to select the elastic earth model.

28. A method for determining a shallow water flow risk area, comprising:
   developing a geologic model of the shallow water flow risk area;
   performing a stratigraphic analysis on reflected P-wave seismic data of the geologic model to determine a control location within the reflected P-wave seismic data;
   applying a pre-stack full waveform inversion on the reflected P-wave seismic data at the control location to provide P-wave velocity (Vp) and Poisson's ratio;
   computing for S-wave velocity (Vs) using the P-wave velocity (Vp) and the Poisson's ratio;
   computing for a ratio (Vp/Vs) between the P-wave velocity (Vp) and the S-wave velocity (Vs); and
   identifying multiple shallow water flow risk areas using the relationship of the ratio (Vp/Vs) with respect to seismic travel time.

29. The method of claim 28, wherein the S-wave velocity (Vs) is computed using $$v = \frac{1 - 2\left(\frac{V_S}{V_P}\right)^2}{2\left[1 - \left(\frac{V_S}{V_P}\right)^2\right]},$$

where $v$ is the Poisson's ratio, Vp is the P-wave velocity and Vs is the S-wave velocity.

* * * * *